(12) United States Patent
Billaud

(10) Patent No.: US 8,860,603 B2
(45) Date of Patent: Oct. 14, 2014

(54) METHOD FOR OPTIMIZING THE MANAGEMENT OF RADAR TIME FOR SECONDARY RADARS OPERATING IN MODES

(75) Inventor: Philippe Billaud, Fontenay aux Roses (FR)

(73) Assignee: Thales, Neuilly sur Seine (FR)

( * ) Notice: Subject to any disclaimer, the term of this patent is extended or adjusted under 35 U.S.C. 154(b) by 732 days.

(21) Appl. No.: 13/126,973

(22) PCT Filed: Oct. 16, 2009

(86) PCT No.: PCT/EP2009/063528
§ 371 (c)(1),
(2), (4) Date: Jun. 21, 2011

(87) PCT Pub. No.: WO2010/049284
PCT Pub. Date: May 6, 2010

(65) Prior Publication Data
US 2011/0279302 A1    Nov. 17, 2011

(30) Foreign Application Priority Data
Oct. 31, 2008    (FR) ...................................... 08 06075

(51) Int. Cl.
*G01S 13/00*   (2006.01)
*G01S 13/74*   (2006.01)
*G01S 13/78*   (2006.01)

(52) U.S. Cl.
CPC .................................... *G01S 13/782* (2013.01)
USPC .................... 342/45; 342/36; 342/37; 342/42

(58) Field of Classification Search
CPC ... G01S 3/9303; G01S 13/781; G01S 13/782; G01S 13/765; G01S 13/784; G01S 13/767; G01S 13/91; G08G 5/0078; G08G 5/0008; G08G 5/0013; G08G 5/0021

USPC .......................................... 342/36–40, 42–51
See application file for complete search history.

(56) References Cited

U.S. PATENT DOCUMENTS 5,032,841 A * 7/1991 Shulenberger .................. 342/37
5,486,829 A * 1/1996 Potier et al. ..................... 342/40

(Continued)

FOREIGN PATENT DOCUMENTS

| EP | 0633481 A1 | 1/1995 |
| EP | 1640743 A2 | 3/2006 |

OTHER PUBLICATIONS

Eurocontrol: "Principles of Mode S Operation and Interrogator codes" Internet Citation Mar. 18, 2003, XP002454133.

(Continued)

*Primary Examiner* — Peter Bythrow
(74) *Attorney, Agent, or Firm* — Baker & Hostetler LLP

(57) ABSTRACT

A method for the real-time management and sequencing of the information interchanges between a secondary radar and a plurality of aircraft includes the interchanges between the radar and a given aircraft being performed, depending on the aircraft concerned, either in a non-selective, SSR, IFF or "All Call" interrogation mode or in a selective "Roll Call" interrogation mode. According to this method, the information interchanges according to the non-selective interrogation modes are performed during successive periods specifically allocated to these modes, whereas each transaction forming an information interchange in selective mode between the radar and a given aircraft is temporally inserted into the time slots not used in periods by the interrogation-response tasks in non-selective mode. The method applies equally to the secondary radars exclusively dedicated to civilian air traffic control and to the secondary radars dedicated to combined civilian and military aircraft control tasks.

9 Claims, 6 Drawing Sheets

(56) References Cited

U.S. PATENT DOCUMENTS

| | | | |
|---|---|---|---|
| 7,095,360 B2 * | 8/2006 | Kuji et al. | 342/29 |
| 7,408,498 B2 * | 8/2008 | Kuji et al. | 342/37 |
| 7,612,705 B2 * | 11/2009 | Ino | 342/37 |
| 7,663,531 B2 * | 2/2010 | Kuji et al. | 342/32 |
| 7,688,250 B2 * | 3/2010 | Billaud et al. | 342/40 |
| 7,710,308 B2 * | 5/2010 | Kuji et al. | 342/32 |
| 7,746,268 B2 * | 6/2010 | Ino | 342/37 |
| 7,936,300 B2 * | 5/2011 | Billaud | 342/37 |
| 2005/0083226 A1 * | 4/2005 | Kuji et al. | 342/29 |
| 2006/0055586 A1 * | 3/2006 | Kuji et al. | 342/32 |
| 2006/0181447 A1 * | 8/2006 | Kuji et al. | 342/32 |
| 2009/0121913 A1 * | 5/2009 | Ino | 342/37 |
| 2009/0295621 A1 * | 12/2009 | Kuji et al. | 342/32 |
| 2010/0253566 A1 * | 10/2010 | Ino | 342/32 |
| 2010/0289689 A1 * | 11/2010 | Kuji et al. | 342/37 |

OTHER PUBLICATIONS

Orlando et al: "Mode S Beacon System: Functional Description" Project Report Lincoln Laboratory, Massachusetts Institute of Technology, US, [Online] No. ATC-42 (rev. D), AD-A174 950, Aug. 29, 1986, pp. 1-7, XP007909447.

Baker J L et al: "Mode S System Design and Architecture" Proceedings of the IEEE, IEEE. New York, US, vol. 77, No. 11, Nov. 1, 1989, pp. 1684-1694, XP000101183 ISSN: 0018-9219 the whole document.

* cited by examiner

METHOD FOR OPTIMIZING THE MANAGEMENT OF RADAR TIME FOR SECONDARY RADARS OPERATING IN MODES

CROSS-REFERENCE TO RELATED APPLICATIONS

This application is a National Stage of International patent application PCT/EP2009/063528, filed on Oct. 16, 2009, which claims priority to foreign French patent application No. FR 08 06075, filed on Oct. 31, 2008, the disclosures of which are incorporated by reference in their entirety.

FIELD OF THE INVENTION

The invention relates to the field of the operating modes of secondary radars, the civilian modes in particular, but can also be used with the military operating modes. It relates more particularly to the management of the time allocated to each of the interrogation modes implemented by a secondary radar to interrogate the aircraft under its control.

BACKGROUND OF THE INVENTION

In the field of air traffic monitoring, the tracking of aircraft in a given area of the air space is conventionally handled by two types of radars, the so-called primary radars whose operation is otherwise known and which require no cooperation of the targets being tracked, and the secondary radars whose operation follows an interrogation-response approach which requires the interrogated target, cooperating target, to respond according to a determined protocol. The operating time of a secondary radar is thus mainly devoted to the emission of successive interrogation messages and to the reception of the corresponding responses emitted by the various targets being tracked.

These days, air traffic control by means of secondary radars uses a large number of interrogation modes. These modes are notably characterized by the type of aircraft, civilian or military, to which they are addressed and by the general or dedicated nature of the interrogations performed. Thus, in particular, the following can be distinguished:

the IFF interrogation modes, for purely military use, such as the SSR 1, 2 and 4 modes for which the interrogations emitted by the secondary radar are addressed to all the military aircraft;

the SSR interrogation modes, for civilian and military use, such as the SSR 3/A and C modes for which the interrogations emitted by the secondary radar are addressed generally, that is to say, addressed to all the civilian and military aircraft;

the "All Call" (or "AC") interrogation modes for which the interrogations emitted by the secondary radar are also addressed a priori to the mode S aircraft not yet managed by the radar in selective interrogations;

the "Roll Call" (or "RC") interrogation modes, for which the selective interrogations emitted by the secondary radar are specifically addressed, each selective interrogation being addressed to a given aircraft which is the only one to respond to this interrogation.

Because of the increasing density of aircraft moving in the same area of space, and the diversity of the interrogation modes, optimizing radar time, that is to say, optimizing the number of interrogations that can be performed at a given time, in principle represents a task that is difficult to complete successfully. In practice, the time at the end of which the response to a given interrogation reaches the radar is notably linked to the protocol employed by the interrogation and to the distance from the aircraft to the radar, a distance that is situated within the limits of the instrumented range of the radar.

The problem of optimizing the time management is therefore becoming increasingly acute, both for civilian and military systems, responsible for air traffic control (ATC). To address the safety constraints, the civilian radar (ATC) in fact have to be able to both provide a long-range coverage, and, for each target being tracked, handle a large number of reply hits on the target, especially for the SSR and IFF interrogation modes, while implementing increasingly high antenna rotation speeds, relative to the rates demanded for the refreshing of the information by the radar. For their part, the military radars, in addition to the interrogation tasks devolved to the civilian radars, the SSR_3/A and SSR_C modes and mode S (or MS) in particular, also have to handle the interrogation tasks in military modes (modes 1, 2, 4, 5).

The result of this is that the illumination time that can be allocated to a given target becomes a rare resource, and all the more so when the radar rotation speed is high and the number of targets to be processed continues to increase.

One solution that is applied these days in the field of military radars consists in spreading over a number of revolutions (conventionally from two to four revolutions) the implementation of these various modes of interrogation of the aircraft being tracked. Consequently, the rate of renewal of the information becomes lower, which gives a result in terms of the refreshing of the information that is opposite to that sought by the use of a higher antenna rotation speed. Such a solution is, moreover, incompatible with the safety constraints imposed in the field of civilian air traffic control, which impose a regular renewal of the information on each antenna revolution.

In the current state of the art, the inclusion of the safety constraints imposed by the international civilian aviation authorities have hitherto led the manufacturers in the field to allocate periods dedicated to the different types of interrogation used (AC, RC, IFF or SSR) and to sequence these interrogations alternately. Each type of interrogation is thus allocated a period of defined duration so that the radar time is broken down into a series of consecutive periods, alternately dedicated to each type of interrogation. The number of IFF and SSR periods must be sufficient for each revolution of the antenna to ensure the correct detection of the aircraft in the SSR and IFF mode concerned.

The Eurocontrol document entitled "Principles of Mode S Operation and Interrogation Code" dated 18 Mar. 2003 also clearly explains that a temporal allocation for each task is recommended.

Thus, in the state of the art, during each time slot dedicated to the interrogation periods of RC ("Roll Call") type, the secondary radar is constrained, the management of the modes being as it is, to addressing two imperatives:

to manage the interleaving of the mode S selective interrogation tasks for the aircraft operating in this mode and located within the antenna lobe concerned and of the tasks for receiving and processing the selective responses returned by these aircraft so that, in particular, the emission of an interrogation does not occur at an instant for which another selective response to a preceding selective interrogation reaches the radar, nor that two selective interrogations or even two selective responses overlap;

to selectively interrogate successfully, that is to say, generating a selective response that is positively decoded by the radar, at least one time, each aircraft operating in mode S during the time slot during which its position is scanned by the antenna lobe.

The arrangement of these tasks must also be performed without overlap so as to avoid the synchronous interference effects between selective responses.

When mode S was introduced, the proportion of aeroplanes equipped with means enabling them to use this mode S (MS) was low, around 20%. Consequently, in the fixed time slot dedicated to the Roll Call interrogations, it was possible to interrogate all the aircraft likely to be interrogated in mode S, given the width of the radar beam and its position at the instant concerned. The rest of the aircraft, in a proportion of around 80%, were then the subject of interrogations in IFF mode, in SSR mode or in All Call (or AC) mode S.

At present, the situation is greatly reversed and it can be assumed that in Europe, notably, most aircraft (more than 95%) are equipped with means enabling them to be interrogated in mode S whereas only 5% are equipped with means enabling them to be interrogated only in SSR and IFF modes. The main consequence of this reversal is that, since the durations of the interrogation periods that correspond to the various modes are fixed, the time interval dedicated to the Roll Call interrogations is becoming insufficient to address the needs of the traffic whereas, at the same time, those dedicated to the All Call or SSR interrogations are largely underused.

The principle of a fixed allocation of the duration of the time slots corresponding to each type of interrogation and the alternation of the corresponding tasks is therefore no longer appropriate and it is better to implement a more suitable principle which does, however, observe the general constraints imposed by the international civil aviation authorities.

SUMMARY OF THE INVENTION

One aim of the invention is to propose a solution that makes it possible to resolve the problem that is posed and in particular to optimally use the radar time to interrogate the maximum of aircraft during the duration of the passage of the antenna lobe.

To this end, the subject of the invention is a method for the real-time management and sequencing of the information interchanges between a secondary radar and a plurality of aircraft, the interchanges between the radar and a given aircraft being performed, depending on the aircraft concerned, either in a non-selective, SSR, IFF or "All Call" interrogation mode or in a selective "Roll Call" interrogation mode.

According to the invention, this method is mainly characterized in that, the information interchanges according to the non-selective interrogation modes being performed during successive periods, each period being specifically allocated to one or more non-selective modes, the interchanges in selective interrogation mode are performed in the form of transactions, each transaction forming an information interchange between the radar and a given aircraft and being temporally inserted into the time slots not used for interrogation-response sequences of operations in non-selective mode.

According to a preferred implementation, the method according to the invention comprises at least:

a first module responsible for the time management and arrangement of the interchanges to be performed within periods allocated to interchanges in non-selective mode;

a second module responsible for the time management of the transactions to be performed in selective mode;

a third module responsible for the arrangement in time of the transactions to be performed in selective mode and for the insertion of the interrogations and the responses forming these transactions in the periods allocated to the interchanges in non-selective mode;

the second module supplies the third module with the information relating to the transactions to be performed given the position of the radar antenna and the first module supplies the third module, for each period allocated to interchanges in non-selective mode, with the information relating to the position and the duration of the time slots during which no other interchange is possible.

According to a variant of this preferred implementation, the second module also temporally manages the ancillary tasks to be performed and the third module inserts these tasks into the general sequencing.

According to this variant, the ancillary tasks are executed during the time slots of the periods allocated to the interchanges in non-selective mode, during which no interrogation or listening-for-response operation forming a transaction in selective mode can be executed.

According to this variant, the ancillary tasks are tasks for testing the correct operation of the radar.

According to a preferred implementation which can be combined with the preceding implementation, the second module generates a predictable overload indicator for the transactions in selective mode, and transmits this indicator to the first module and to the space-time management system of the radar.

The indicator is activated if, given the number of transactions in selective mode to be performed and the time slots during which no transaction is possible, it is not possible to perform all the required transactions in selective mode.

According to this implementation, when the predictable overload indicator is activated, the first module modifies the sequencing of the information interchange periods in non-selective mode to insert information interchange periods in selective mode into this sequencing, the information interchanges in selective mode then being performed both in the form of transactions performed asynchronously and in the form of transactions executed during the periods allocated to the interchanges in selective mode that have been inserted.

BRIEF DESCRIPTION OF THE DRAWINGS

The features and advantages of the invention will be better appreciated by virtue of the following description, a description which explains the invention through a particular embodiment taken as a nonlimiting example and which is based on the appended figures, which represent.

DETAILED DESCRIPTION

Figure 1:
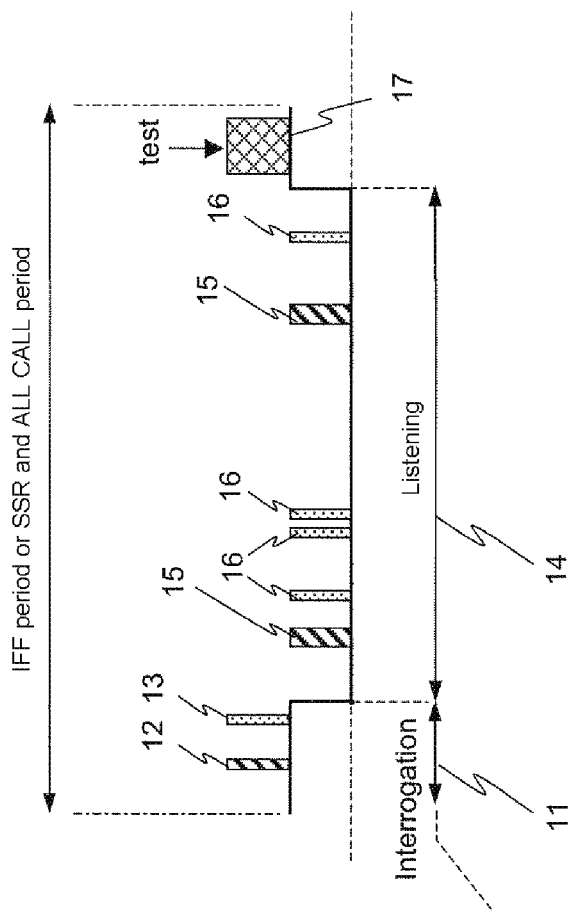
FIGS. 1 and 2, illustrations of the current state of the art concerning the sequencing of the SSR and ALL CALL (AC) periods and of the ROLL CALL (RC) periods.
Figure 2:
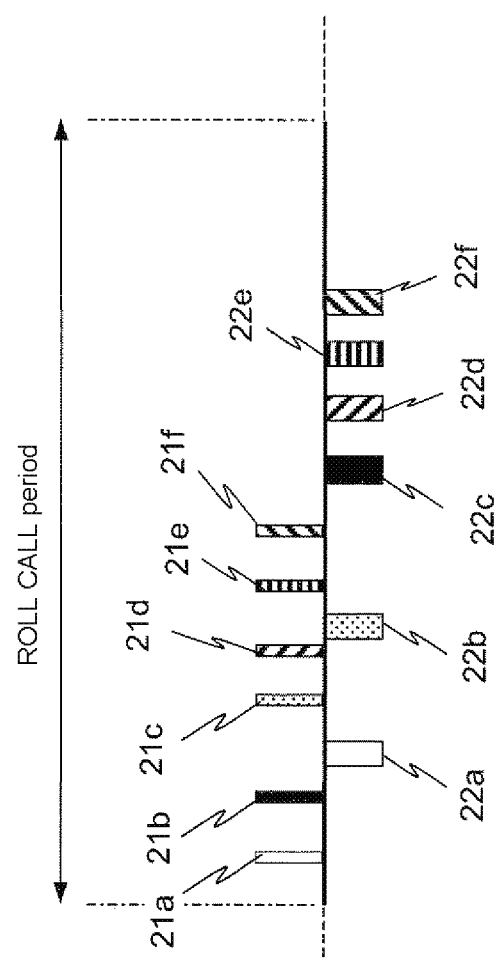
Figure 3:
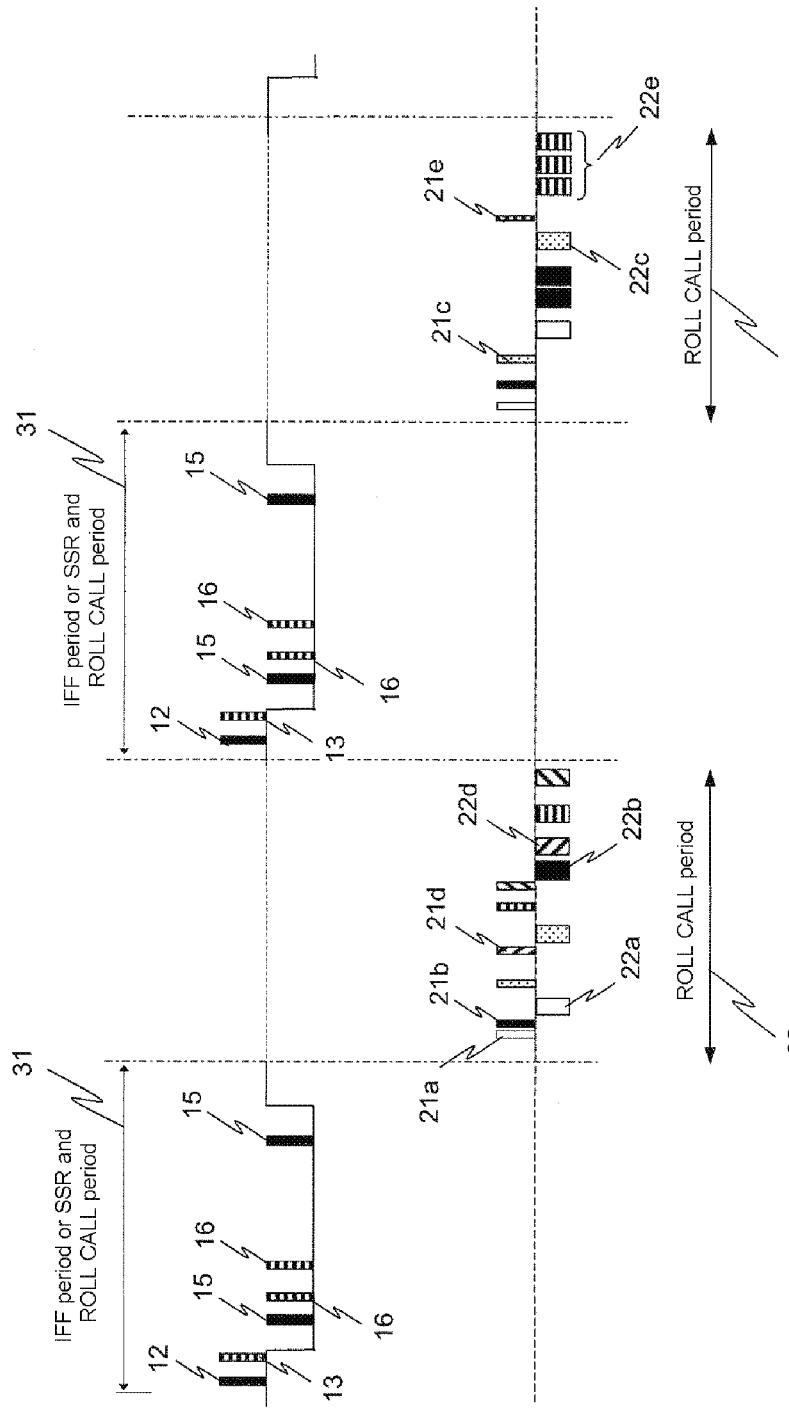
FIG. 3, the illustration of the sequencing principle, according to the current state of the art, for the various interrogation periods implemented by civilian radar.

The object of the illustrations of FIGS. 1 to 3 is to highlight the problem that is posed by illustrating the sequencing principle currently implemented.

As stated previously, a first interrogation principle consists, for the secondary radar, in periodically emitting an interrogation message that is addressed generally to which, in the absence of more precise instructions, each aircraft having received this message should respond. According to this first interrogation principle, which corresponds in practice to the SSR and All Call (AC) (civilian air traffic) and IFF (military air traffic) interrogation modes, an interchange period consists, as illustrated by FIG. 1, of a first phase 11 in which the radar emits, generally, an interrogation 12 in All Call mode and/or an interrogation 13 in SSR mode. This first phase 11 is followed by a second phase 14 during which the radar is listening for any responses 15 or 16 in All Call mode or in SSR mode. The duration of the second phase 14 is mainly conditioned by the range of the radar. The time slots that are not used by the listening tasks 15 and 16 are generally used to implement ancillary tasks 17 such as test tasks.

A second interrogation principle, illustrated by FIG. 2, consists, for the secondary radar, in emitting a series of dedicated interrogation messages 21, each of which is addressed to a particular aircraft and to which only this aircraft is authorized to respond. After receiving the interrogation message 21, the aircraft concerned returns a response 22.

According to this principle, the interrogation messages are emitted at chosen instants so that the emission of an interrogation message does not prevent the reception of a response sent by an aircraft that has previously been interrogated. For this, the definition of the listening bands for the returned responses notably takes into account the positional uncertainty that the tracking computes on the basis of the positions of the target in previous revolutions and of the maneuvering capabilities of the aircraft concerned. The principle also ensures that the listening bands do not overlap.

This second selective interrogation principle, which corresponds in practice to the ROLL CALL interrogations in mode S, therefore presupposes that each aircraft concerned has previously been detected by the secondary radar (on the occasion of an All Call interrogation) and that it is also equipped with means enabling it to identify that the dedicated interrogation message concerned is addressed to it. It also presupposes that the position of each aircraft likely to be interrogated is known at each instant. It further presupposes taking into account, for the sending of a given selective interrogation, taking into account the predicted position of the aircraft concerned, the interrogation of a particular aircraft at a given instant being possible only if the aircraft is situated in the area scanned by the radar beam at that instant.

According to this second mode, the secondary radar, taking into account the direction pointed to by the beam and the tracking information available to it, emits interrogation messages $21_i$ (i=a, b, c, . . . etc.) addressed to the various aircraft located in all likelihood in the area scanned by the radar beam and collects the responses $22i$ supplied by each of the aircraft.

In a Roll Call operation, the overall sequencing, and in particular the instant of emission of an interrogation message, is therefore determined dynamically according to the expected positions of the aircraft being interrogated. The main constraint is in this case two-fold.

On the one hand, it is essential for an interrogation to be emitted at a given instant only if no expected response is likely to be received at that instant.

It is also essential for an interrogation to emitted at a given instant only if, given the relative positions of the aircraft involved in these interrogations, no response to a preceding interrogation is likely to simultaneously arrive at the same time as the response corresponding to the interrogation emitted. In other words, the sequencing of the instants of emission of the selective interrogation messages 21 in a Roll Call (RC) sequence must take into account, on the one hand, the direction pointed to by the antenna beam and, on the other hand, the distances of the various aircraft likely to be interrogated by the radar during the time slot concerned.

Although it otherwise presents numerous advantages, the use of the Roll Call interrogation Roll Call mode does, however, present the drawback of involving a relatively complex time management. In practice, as the number of aircraft having to be managed in RC mode increases, optimizing the use of the radar time dedicated to the interchanges in RC mode, so as to perform the greatest possible number of interchanges, is increasingly difficult. In practice, according to an established operating regime, most aircraft are interrogated in Roll Call mode and only a few aircraft, for example those entering into the space that is monitored and not yet identified at the instant concerned or those equipped with means enabling them only to use the SSR or All Call mode, respond in the periods dedicated to the interrogations-responses of this type. This means that, currently, as illustrated by FIG. 3, the fixed time bands 31 allocated to operation in All Call mode are generally underused whereas the time bands 32 allocated to operation in Roll Call mode are saturated. The problem is therefore how to find a way of increasing the time allocated to operation in Roll Call mode.

The management method according to the invention makes it possible to consider another type of arrangement. This type of arrangement, illustrated by FIG. 4, makes it possible to observe the time constraints imposed by the various applicable regulations on air traffic control, in particular regarding the need to assign a minimum duration to each time slot allocated to the SSR, IFF and All Call interrogations. It mainly consists in substituting a new arrangement for the entirely synchronous arrangement according to the prior art, an arrangement consisting of a succession of interrogation periods specifically allocated to All Call, SSR or IFF mode interrogations, separated from one another by one or more Roll Call periods.

According to this original arrangement, that is qualified as "mixed", a continuous series of All Call, SSR or IFF mode interrogation periods 41 is formed (the IFF interrogations are not represented in the figure in the interests of legibility), into which are inserted interrogation-response tasks 42, Roll Call mode transactions, managed asynchronously relative to the interrogations in All Call or SSR mode (or IFF mode).

From a temporal point of view, the arrangement according to the invention is managed by a sequencing method whose role consists, on the basis of all the information supplied to it, in exploiting the time slots 43 left free in each of the All Call or SSR (or IFF) periods to execute interrogation-listening tasks in Roll Call mode. The Roll Call tasks that are executed are determined on the basis of the knowledge that the radar has a priori for each aircraft interrogated in Roll Call mode, of the duration of the signals emitted and received, of the distance separating it from the radar (the knowledge of the distance incorporating the uncertainty concerning the prediction of the position of the aircraft concerned), and therefore of the delay $\Delta T_i$ (i=a, b, c, . . . etc.) separating the interrogation emitted by the radar from the response returned by the aircraft. This means that the sequencing of the Roll Call selective interrogations, although still temporally linked to the sequencing of the All Call and SSR mode interrogations, is no longer linked to the rigid sequencing of the periods of fixed durations which constitutes this sequencing and in which the interrogations in All Call or SSR or IFF mode take place. The asynchronism that is thus put in place advantageously makes it possible to optimize the radar time by organizing the Roll Call interrogations in a single continuous sequence, asynchronous from the All Call, SSR and IFF periods, which thus makes it possible to best exploit the available radar time. Furthermore, the selective interrogations in RC mode no longer being allocated according to a quota in an RC period specifically allocated to these tasks, it is advantageously possible to place these interrogations spontaneously as they appear without having to implement an algorithm to optimize this placement, such an optimization being necessary when all the interrogations have to be executed in a period specifically dedicated to the RC mode transactions. This way, the placement can favour, depending on the requirements, either the optimization of the radar time occupancy rate or an increase in responsiveness faced with a polluted environment but one that is less densely populated with aircraft. Consequently, the resulting constraint is then no longer to have to manage, in time slots of fixed duration, an increasingly large number of interrogations $21_i$, $22_i$, but rather to optimally manage the use of dead times that might exist to perform the maximum of selective interrogations and responses during each dead time. This substitution of one constraint with another, looser constraint advantageously makes it possible to process a larger number of aircraft in a given time.

It should be noted that the method according to the invention makes it possible to manage the ancillary tasks, the test tasks 17 in particular, according to the same principle as the transactions in Roll Call mode, that is to say, asynchronously from the sequencing of the allocated periods. This way, the execution of the ancillary tasks is handled by best using the time slots left available in the periods allocated to the IFF, SSR and All Call modes and not employed to perform transactions in Roll Call mode. This way, it is possible to execute the ancillary tasks at appropriate instants chosen according to the number of information interchanges to be handled.

Figure 4:
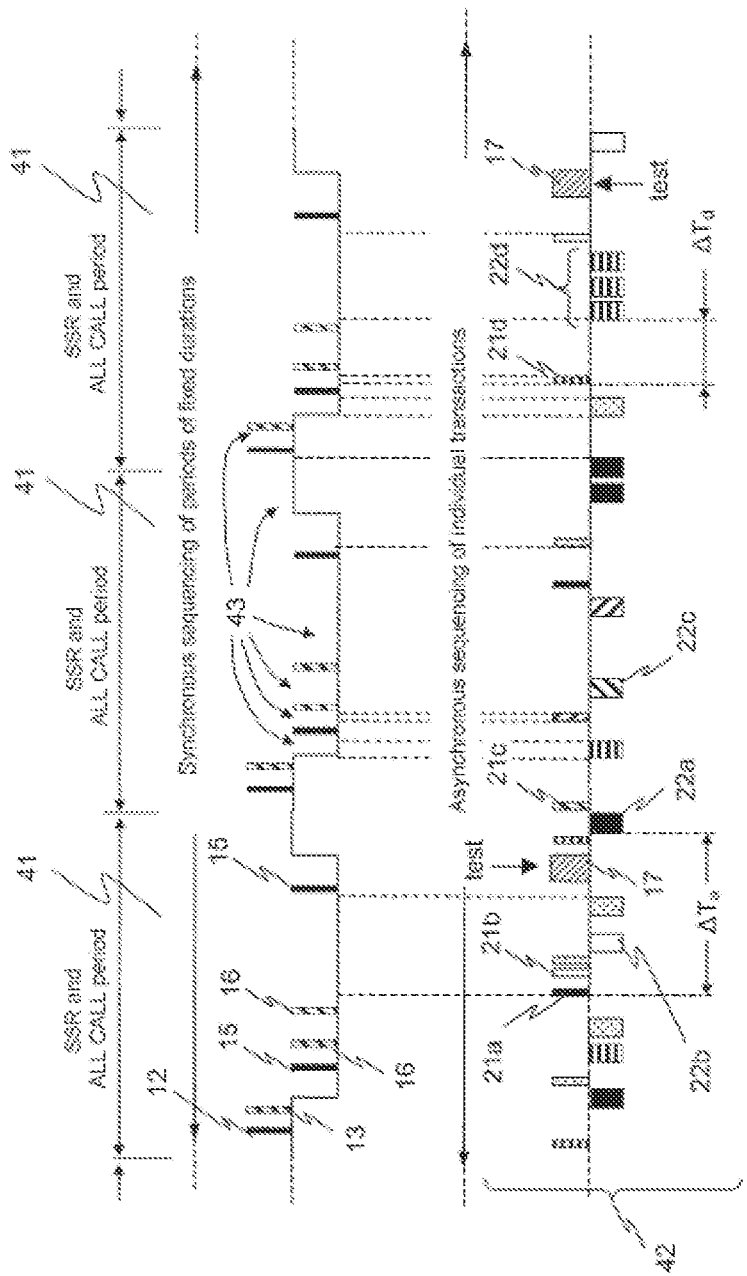
FIG. 4, the illustration of the sequencing principle for the various interrogation periods and sequences obtained by means of the method according to the invention.
Figure 5:
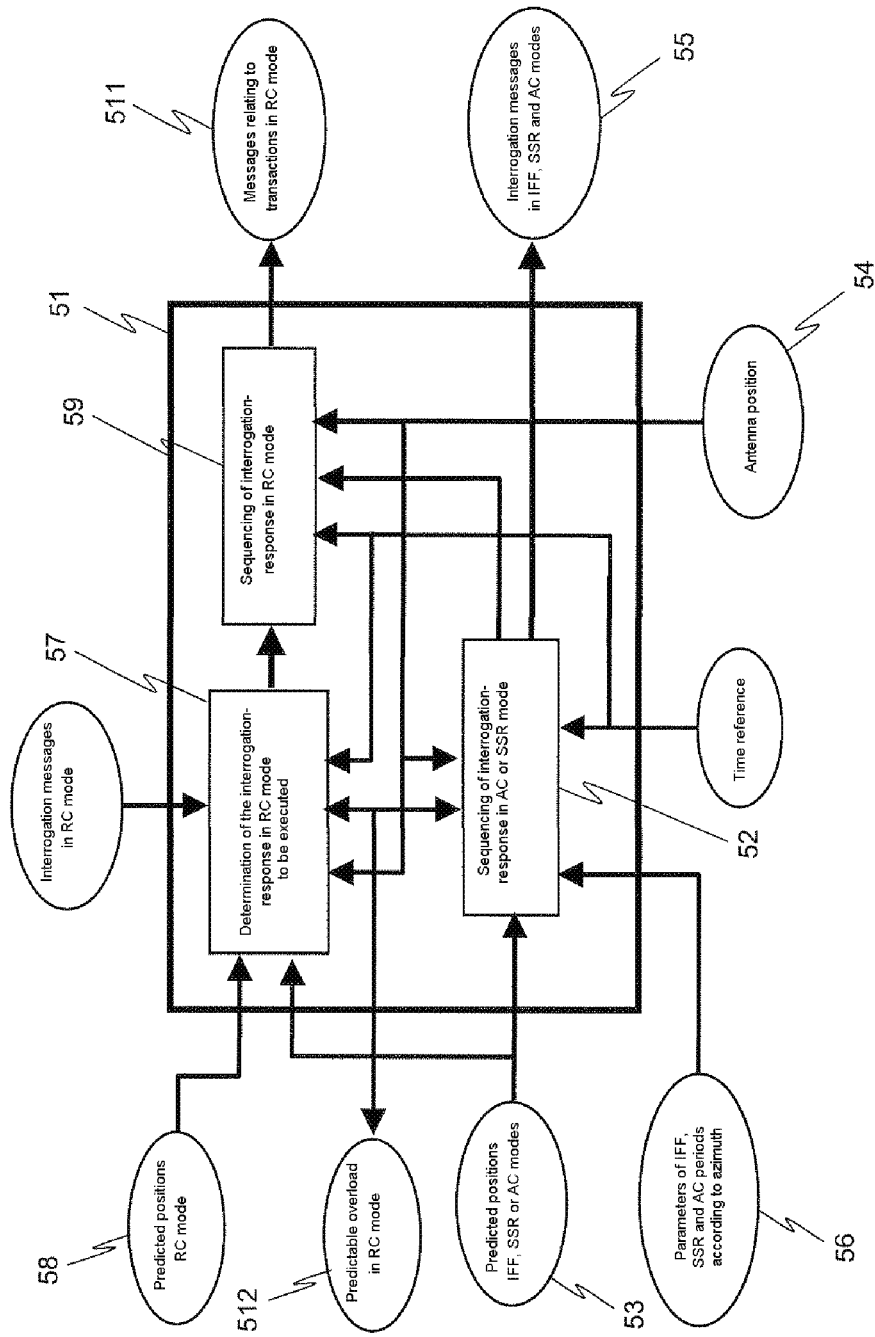
FIG. 5, a diagram describing the main modules forming the method according to the invention.

To construct the arrangement according to the invention, described by FIG. 4, the method according to the invention implements various processing modules shown illustrated in FIG. 5.

As can be seen in the figure, the method 51 mainly comprises three modules 52, 57 and 59 which communicate with one another and exchange information with the other functional elements of the radar.

The first module 52 is responsible for handling the management of the periods dedicated to the interchanges in SSR, IFF and All Call modes. To this end, it receives information 56 enabling it to determine the sequencing of the interrogation modes and the duration of the corresponding periods, according to the direction in which the antenna is pointing. Such information is, for example, for each period, the desired instrumented range for the azimuth concerned, or else the desired SSR, IFF and All Call communication mode. Module 52 mainly prepares the messages 55 describing the interrogations to be performed and delivers them to the subassembly responsible for generating these interrogations.

The module 52 also receives, as and when it is prepared, the information 53 relating to the predicted positions of the aircraft operating in these modes whose movements are already taken into account by the tracking system of the radar. Such information is transmitted to the module 52 by the system responsible for the tracking, in the form of predicted plots notably giving the position in azimuth and in distance of the aircraft, and the uncertainty associated with this position.

From the information relating to the interrogation mode to be employed, the tracking information and the information 54 relating to the position of the antenna, the module 52 mainly prepares, for each period 41, messages addressed to the module 59 relating to the time slots corresponding to the interrogations performed and to the responses expected during this period, these time slots then being prohibited to any other transaction.

The second module 57 is responsible for handling the management of the interchanges in Roll Call mode. To this end, like the module 52, it receives in particular, as and when it is prepared, the information 58 relating to the predicted positions of the aircraft operating in this mode whose movements are already taken into account by the tracking system of the radar, and the information relating to the transactions to be performed for each of these aircraft. For this, it takes into account the position information 58 concerning the aircraft which, previously interrogated in All Call mode, are declared capable of operating in Roll Call mode. In practice, such information is transmitted to the tracking function by the subassembly responsible for processing the responses returned by the aircraft that have been interrogated, said tracking function using the information to predict the position of the aircraft in the next revolution.

From the information that is available to it and the information 54 relating to the position of the antenna, the module 57 determines the targets that are visible to the radar at the instant concerned and prepares requests relating to the interrogation-response tasks (i.e. to the transactions) in Roll Call mode that are to be executed. It transmits this information according to an appropriate sequencing, to the module 59 responsible for handling the sequencing of these tasks.

The second module 57 is also responsible for taking into account the Roll Call mode transactions already initialized in the antenna lobe with a given target and which, for any reason, requires a new interchange with this target. Such is, for example, the case when the interrogation emitted has not evoked any response or the received response is wrong. It is also the case when a new transaction is required by the target, for a transfer of information for example. In such circumstances, the module 57 prepares for the module 59 one (or more) new transaction requests.

In a preferred implementation, the module 57 also receives information relating to various ancillary tasks to be performed, such as, notably, test tasks, tasks which, according to the known prior art, are generally performed at fixed instants during SSR, IFF or All Call interrogation periods.

The main function of the third module 59 is to determine the optimum temporal arrangement of the transactions requested by the module 57. For this, it receives from the module 52 information relating to the time slots during which no Roll Call mode transaction is possible without risking conflict with the transactions performed in the other modes.

Based on the information transmitted by the modules 52 and 57 and the information 54 relating to the position of the antenna, the module 59 mainly prepares the messages 511 describing the transactions to be performed and delivers them according to an appropriate sequencing to the subassembly responsible for implementing these transactions (i.e. for generating the corresponding interrogations). For this, it first determines, according to the nature and the quantity of transactions to be processed and by taking into account the prohibited time slots, the instants of the interrogations and the temporal position as well as the duration of the listening windows corresponding to each transaction. This determination results in a sequencing that is asynchronous from that of the interrogation-response tasks performed in the other communication modes, IFF, SSR or All Call. It then prepares the information relating to the transactions to be carried out, the emission of an interrogation at a given instant and listening for the response during a determined time slot. The start instant of the listening time slot is defined by the predicted distance of the aircraft concerned and by the uncertainty concerning its position. Its duration is, moreover, dependent on the response expected from the aircraft and on the uncertainty concerning its position. This information is transmitted, according to the established sequencing, respectively to the subassembly responsible for generating the interrogations and to the subassembly responsible for processing the received signals.

As described previously, the instants of the interrogations and the temporal position as well as the duration of the listening windows corresponding to each transaction can be determined dynamically in different ways. It is thus possible to position the transactions as they arise. This way of working is preferred if a rapid placement of the transactions in Roll Call mode in the general sequencing of the interchanges is required. Alternatively, the transactions can be considered globally and the Roll Call transactions can thus be better compacted, while still ensuring that the Roll Call transactions do not overlap with one another while observing the prohibited time slots. This way of working is more effective for occupying the radar time available on the aircraft, which provides a better response to significant densities of aircraft and transactions to be done at a given azimuth.

Figure 6:
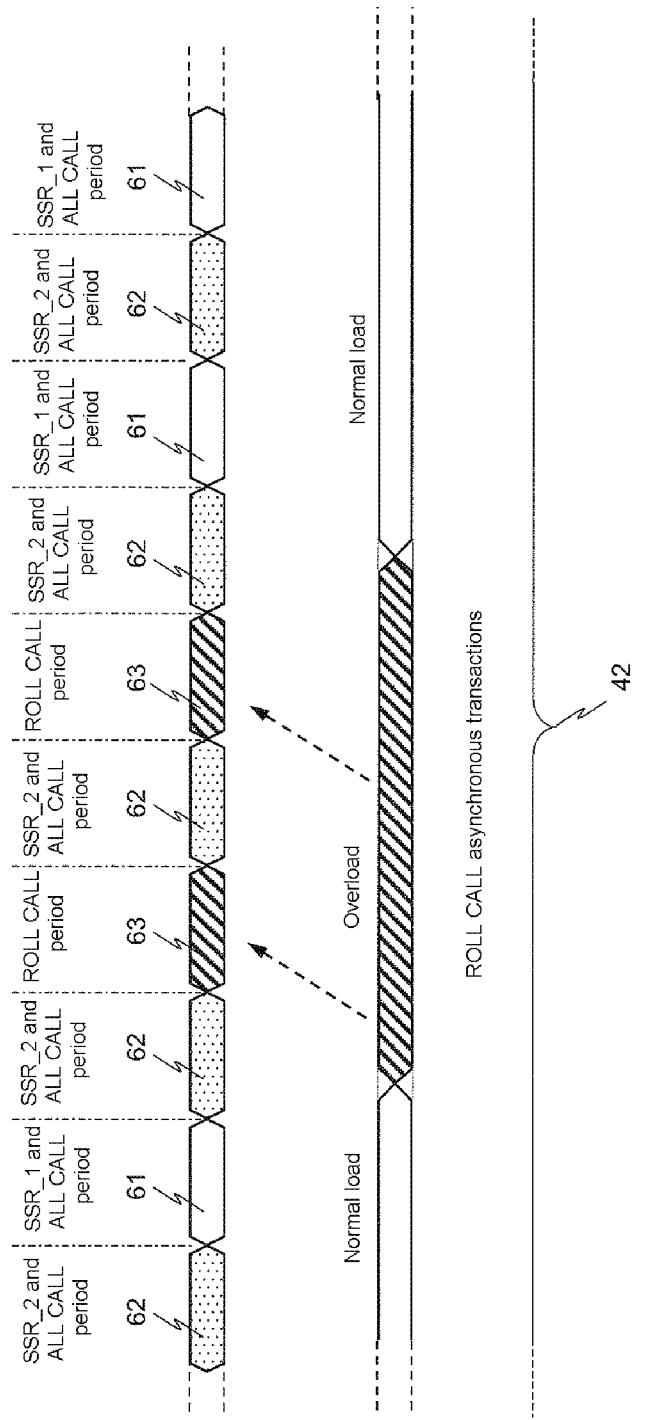
FIG. 6, the illustration of an advantageous implementation of the method according to the invention.

The sequencing of the transactions in Roll Call mode according to the invention, is very largely asynchronous from the periods in IFF, SSR or All Call mode. It is this original organization, which uses all the available time slots, which makes it possible to limit the appearance of the phenomenon of saturation of the transactions in Roll Call mode, a phenomenon which can be observed in the methods of the prior art when it is demanded that the selective transactions in RC mode be placed exclusively in allocated RC periods. However, as has also been discussed, it may be that the freedom afforded by implementing this asynchronous sequencing is not sufficient to avoid the saturation. This is why the method according to the invention provides the advantageous possibility of dynamically interleaving synchronous communication periods allocated in Roll Call mode. This possibility is particularly advantageous when, as in the example of FIG. 6, in a given sector of the monitored space, the number of aircraft communicating with the radar in Roll Call mode is very high. In practice, the sequencing method according to the invention then makes it possible to dynamically modify the sequencing of the interrogation periods to general mode, IFF, SSR, or All Call, so as to locally include, for a given azimuth, a period 63 allocated to the interchanges in Roll Call mode, during which selective communication tasks, transactions, in Roll Call mode, are performed, either instead of one of the periods 61 normally expected (case represented in FIG. 6) or, alternatively, by inserting this Roll Call period 63 between two periods 61. This way, the selective interrogation tasks in Roll Call mode for which no allocation of a time slot would have been possible by the asynchronous sequencing 42 are performed during these temporarily introduced Roll Call periods 63.

It should be noted that the choice of substituting a period 63 for a period 61 that is normally expected or of inserting a period 63 between two periods 61 is performed by taking into account various factors. A first factor notably consists of the potential margin in the number of reply hits on the target in the SSR, IFF and AC modes that the implementation of the invention makes it possible to obtain, given that the elimination of all the RC periods rigidly imposed in a conventional sequencing makes it possible either to have, in each mode, more reply hits on the target, or to insert additional modes into the sequencing. Another factor consists of the mission of the radar, more particularly of the priority mainly given to the quality of the data gathered in each mode or to the greater number of modes refreshed on each revolution.

This modification of the arrangement of the IFF, SSR or All Call tasks including the periods strictly allocated to an IFF, SSR or All Call mode can in this case be performed at the request of the module 57 which, in this case, transmits a predicted overload in Roll Call mode 512 information item to the module 52 and to the radar subassembly responsible for the space-time management so that the latter orders a modification of the sequencing of the IFF, SSR and All Call synchronous periods.

This information, which indicates to the latter that the module 59 will not be able to determine a sequencing that makes it possible to execute all the selective Roll Call mode transactions that have to be performed, is determined in advance by the module 57 according to the predicted number of selective transactions in Roll Call mode to be placed and the predicted number of aircraft responding in the SSR, IFF and All Call periods (prohibited time slots). These two information items determine a total time dedicated to the interrogations and receptions which, compared to the target illumination time, which is itself a function of the antenna of the radar and its rotation speed, makes it possible to determine whether the placement of all the selective mode S interrogations in the remaining available time is possible or not. This determination takes into account the effectiveness of the algorithm used by the module 59 to perform the placement of the interrogations and responses relating to the transactions in Roll Call mode in the general sequencing.

The radar subassembly responsible for the space-time management processes the overload information in a variable manner according to the priority missions handled by the radar in the azimuth concerned. This way, depending on whether priority is given to monitoring targets communicating in mode S or monitoring aircraft in SSR and IFF modes, the information items 56 will or will not be modified to order the module 52 to introduce periods allocated to the selective communications in Roll Call mode between the communication periods in IFF, SSR or All Call mode.

The invention claimed is:

1. A method for real-time management and sequencing of information interchanges between a secondary radar and a plurality of aircraft, the interchanges between the secondary radar and one of the plurality of aircraft being performed either in a non-selective, SSR, IFF or "All Call" interrogation mode or in a selective "Roll Call" interrogation mode, the method comprising:

performing information interchanges during successive periods with the secondary radar when the information interchanges are according to the non-selective interrogation modes, each period being specifically allocated to one or more of the non-selective interrogation modes; and performing the information interchanges in a form of transactions with the secondary radar when the information interchanges are in selective interrogation mode, each transaction forming an information interchange between the secondary radar and the one of the plurality of aircraft and being temporally inserted into time slots not used for interrogation-response tasks in the non-selective interrogation mode in the periods allocated to the non-selective interrogation modes.

2. The method according to claim 1, further comprising:

performing time management and arrangement of the information interchanges with a first module of the secondary radar, the first module responsible for the time management and arrangement of the information interchanges to be performed within the periods allocated to interchanges in the non-selective interrogation mode;

performing time management with a second module of the secondary radar, the second module responsible for the time management of the transactions to be performed in the selective interrogation mode;

performing an arrangement in time of the information interchanges with a third module of the secondary radar, the third module responsible for the arrangement in time of the information interchanges to be performed in the selective interrogation mode and for insertion of the interrogations and responses forming the information interchanges in the periods allocated to the interchanges in the non-selective interrogation mode; and supplying from the second module to the third module information relating to the information interchanges to be performed given a position of a secondary radar antenna and the first module supplying the third module, for each period allocated to the information interchanges in the non-selective interrogation mode, with the information relating to the position and the duration of the time slots during which no other interchange is possible.

3. The method according to claim 2, wherein temporally managing with the second module ancillary tasks to be performed, and inserting with the third module the tasks into a sequencing.

4. The method according to claim 3, wherein the ancillary tasks are executed during time slots of the periods allocated to the information interchanges in the non-selective interrogation mode, during which no interrogation or listening-for-response operation forming a transaction in selective interrogation mode can be executed.

5. The method according to claim 3, wherein the ancillary tasks are tasks for testing a correct operation of the secondary radar.

6. The method according to claim 2, wherein the second module of the secondary radar generates a predictable overload indicator for the information interchanges in the selective interrogation mode, and transmits the predictable overload indicator to the first module and to a space-time management system of the secondary radar, the indicator being activated if, given the number of transactions in the selective interrogation mode to be performed and the time slots during which no transaction is possible, it is not possible to perform all required information interchanges in the selective interrogation mode.

7. The method according to claim 6, wherein, when the predictable overload indicator is activated, the first module of the secondary radar modifies a sequencing of the information interchange periods in the non-selective interrogation mode to insert information interchange periods in the selective interrogation mode into the sequencing, the information interchanges in the selective interrogation mode then being performed both in a form of transactions performed asynchronously and in a form of transactions executed during the periods allocated to the information interchanges in the selective interrogation mode that have been inserted.

8. The method according to claim 3, wherein the second module of the secondary radar generates a predictable overload indicator for the transactions in the selective interrogation mode, and transmits the predictable overload indicator to the first module and to a space-time management system of the secondary radar, the predictable overload indicator being activated if, given the number of transactions in the selective interrogation mode to be performed and the time slots during which no transaction is possible, it is not possible to perform all required information interchanges in the selective interrogation mode.

9. The method according to claim 8, wherein when the predictable overload indicator is activated, the first module of the secondary radar modifies the sequencing of the information interchange period in the non-selective interrogation mode to insert information interchange periods in the selective interrogation mode into the sequencing, the information interchanges in the selective interrogation mode being performed both asynchronously and during periods allocated to the information interchanges in the selective interrogation mode that have been inserted.

* * * * *